United States Patent
Dreisbach et al.

(10) Patent No.: US 6,369,010 B1
(45) Date of Patent: Apr. 9, 2002

(54) METHOD AND COMPOSITION FOR PREVENTING PITCH DEPOSITS IN PAPER MILLS USING RESINOUS MECHANICAL PULPS

(75) Inventors: David D. Dreisbach, Marietta; Jeffrey N. Champine, Atlanta, both of GA (US)

(73) Assignee: Vinings Industries, Inc., Kennesaw, GA (US)

( * ) Notice: Subject to any disclaimer, the term of this patent is extended or adjusted under 35 U.S.C. 154(b) by 0 days.

(21) Appl. No.: 09/452,820

(22) Filed: Dec. 1, 1999

(51) Int. Cl.⁷ .............................. C09D 9/02; C11D 17/00
(52) U.S. Cl. ...................... 510/213; 510/201; 510/202; 510/203; 510/206; 510/245; 510/365; 510/505
(58) Field of Search .......................... 516/27; 510/201, 510/202, 203, 206, 207, 210, 211, 212, 213, 245, 365, 407, 417, 499, 505, 506

(56) References Cited

U.S. PATENT DOCUMENTS

| | | | |
|---|---|---|---|
| 4,715,931 A | 12/1987 | Schellhamer et al. | |
| 4,861,429 A | 8/1989 | Barnett et al. | |
| 4,895,622 A | 1/1990 | Barnett et al. | |
| 4,995,944 A | 2/1991 | Aston et al. | |
| 5,167,767 A | 12/1992 | Owiti et al. | |
| 5,520,781 A | 5/1996 | Curham et al. | |
| 5,575,893 A | 11/1996 | Khan et al. | |
| 5,597,792 A | * | 1/1997 | Klier et al. |
| 5,651,812 A | 7/1997 | McDermott et al. | |
| 5,776,310 A | 7/1998 | McDermott et al. | |
| 5,972,874 A | * | 10/1999 | Libutti et al. |

* cited by examiner

Primary Examiner—Yogendra N. Gupta
Assistant Examiner—Gregory E. Webb
(74) Attorney, Agent, or Firm—Alston & Bird LLP

(57) ABSTRACT

The present invention is a method and composition for preventing the deposition of contaminants from resinous pulp and/or recycled pulp in the press section of a pulp and paper process. The composition of the invention includes a cleaning solvent comprising a blend of aromatic hydrocarbons containing between nine and eleven carbon atoms and a surfactant comprising an alcohol ethoxylate. The composition of the invention can be applied to the felts in the press felt section of a pulp and paper process to break down and loosen deposited contaminants and the contaminants can be removed thereby preventing the need for batch cleaning and downtime in the press felt section.

34 Claims, 2 Drawing Sheets

METHOD AND COMPOSITION FOR PREVENTING PITCH DEPOSITS IN PAPER MILLS USING RESINOUS MECHANICAL PULPS

FIELD OF THE INVENTION

The present invention relates to a method and composition for preventing the deposition of pitch and other contaminants in the press section of a pulp and paper process, and particularly in a pulp and paper process that uses resinous mechanical pulps, either alone or in combination with recycled pulps.

BACKGROUND OF THE INVENTION

Paper machines that make paper from resinous thermomechanical pulps have historically suffered from operational problems in the press section of the paper process. In particular, resinous materials or pitch can become trapped within the felt structure and can deposit on the surface of press felts, rolls, and uhle boxes, thereby hindering the effective removal of water from the paper web as it is being produced. As a result, these deposits cause reduced operational efficiency and reduce the quality of the paper being produced.

Heretofore, paper mill operators have attempted to deal with the problem of pitch deposition by applying surfactant-based cleaners, solvents, or mixtures thereof to the press section. The surfactant-based cleaners and solvents are either fed continuously while the paper machine is in operation and making paper (continuous cleaning) or when the paper machine is down and not making paper (batch cleaning) to remove pitch from the press section.

One particular class of surfactants that has traditionally been used to remove pitch deposits from felts using both continuous and batch cleaning processes are the alkyl phenol ethoxylates, e.g., the nonylphenol alkoxylates. U.S. Pat. Nos. 5,167,767; 5,520,781 and 5,575,893 describe the use of ethoxylated phenols such as nonylphenol ethoxylates for use as felt conditioners. Although these surfactants are commonly used, the federal government has begun to closely regulate the alkyl phenol ethoxylates due to concerns about their biodegradation and their possible estrogenic effects on aquatic life. In particular, the federal government has listed certain nonylphenol ethoxylates and related compounds and derivatives (e.g. nonylphenol based phosphate esters, octyl phenols, dinonyl phenols, dodecyl phenols and related alkylphenol based compounds) as SARA Toxic Release Chemicals and requires extensive reporting and tracking of many of these compounds.

The solvents that are used to remove pitch from the press section can also have undesirable environmental effects. For example, large quantities of high flash point solvents such as kerosene are presently used to remove pitch deposits. However, the use of large amounts of kerosene and other high flash point solvents is undesirable due to the potential adverse effects it can have on workers and the environment. Furthermore, paper mills are expected to reduce the use of solvents that contain volatile organic compounds (VOC's) because the vapors from these solvents react in the atmosphere to create smog and other adverse atmospheric conditions.

In addition to environmental problems, most surfactant-based cleaners and solvents typically are not effective enough to prevent the need for downtime during operation of the paper mill. Although many prior art products extend the time between downtime periods or batch cleanings, these products generally do not eliminate the need for downtime. As is readily understood by those skilled in the art, it is advantageous for mills to operate with limited downtime. In particular, the felts in the pressing section can typically be used for between four and eight weeks before they are mechanically worn out and need to be replaced. Therefore, if a mill can run for four to eight weeks without downtime using a continuous cleaning process, it is economically advantageous.

The problem of pitch deposition on press section equipment has been further complicated by recent changes in the operation of paper mills. For example, the mill operators have begun to reuse water produced during operation of the paper mill to reduce fresh water consumption. Thus, contaminants that used to be eliminated from the mill now become more concentrated in the press section and show a greater tendency to deposit on the press section equipment.

Another recent change that makes eliminating the pitch deposition on press section equipment even more difficult is the recent trend towards recycling pulp. Recycled pulp typically includes high levels of contaminants such as inks and adhesives and these contaminants can also become mechanically trapped within the felt structure. Therefore, compositions for removing pitch generally must be able to remove the inks and adhesives that are trapped within the felt structure.

Therefore, there is a need in the art to produce a cleaning composition that can effectively remove pitch from felts and other pressing equipment in a continuous cleaning process without requiring downtime and batch cleaning. Furthermore, there is a need to produce a cleaning composition that is environmentally safe that effectively removes inks, adhesives, and other contaminants from pressing equipment.

SUMMARY OF THE INVENTION

The present invention provides a continuous method and composition for preventing the deposition of contaminants from resinous pulp and/or recycled pulp in the felt press section of a pulp and paper process. The present invention is highly effective in breaking down contaminants from resinous pulps and recycled pulps that are detrimental to press section and papermaking operations and that block felt surfaces. The method and composition of the invention eliminates the need for batch or downtime cleaning and allows the press section to operate with good efficiency to produce paper having good quality. The present method and composition has also been shown to be more effective than environmentally undesirable nonylphenol containing formulations. Furthermore, the present invention accomplishes effective cleaning using a low concentration of solvent-type materials.

The present invention provides a composition that includes a cleaning solvent comprising a blend of aromatic hydrocarbons containing between nine and eleven carbon atoms and a surfactant comprising an alcohol ethoxylate. The combination of the cleaning solvent and the alcohol ethoxylate, and particularly a branched or secondary alcohol ethoxylate, produces synergistic results in removing pitch and is useful in removing other contaminants from press machinery including ink, sizing agents, coatings, waxes and stickies. The composition is also substantially free of alkyl phenols, alkylphenol ethoxylates, naphthalene and other environmentally undesirable compounds. In addition, the composition of the invention provides effective cleaning while using a minimal amount of VOC's.

In accordance with the invention, the composition for inhibiting the deposition of pitch and other deposits on pulp and paper machinery includes a cleaning solvent comprising a blend of aromatic hydrocarbons containing between nine and eleven carbon atoms and preferably having a flash point of greater than 140° F., and an alcohol ethoxylate, preferably a branched or secondary alcohol ethoxylate, and more preferably a tridecyl alcohol ethoxylate. Preferably, the solvent of the composition is substantially free of naphthalene and the surfactant of the composition is substantially free of alkyl phenols and alkylphenol ethoxylates such as nonylphenol ethoxylates. The surfactant preferably includes between 6 and 16 moles ethylene oxide, more preferably between 8 and 10 moles ethylene oxide, per mole of alcohol. The mass ratio of cleaning solvent to alcohol ethoxylate in the present composition is preferably from about 1:10 to about 10:1, more preferably from about 1:3 to about 3:1. In addition to the cleaning solvent and the alcohol ethoxylate, the present composition can also include formulation solvents, water, additional surfactants, buffers and other additives.

The present invention further includes a continuous method for inhibiting the deposition of contaminants from resinous pulps and recycled pulps on machinery in a pulp pressing process. According to the present method, an advancing paper stock material is contacted with an advancing pressing felt to remove moisture from the paper stock material. After the advancing pressing felt contacts the paper stock material, a deposition-inhibiting effective amount of the cleaning composition described above is applied to the advancing felt, preferably by spraying, to loosen pitch and other deposited contaminants from the felt. The loosened contaminants are then removed from the advancing pressing felt and the advancing pressing felt is again contacted with paper stock material to remove moisture from the paper stock material. The present method operates continuously to reduce or eliminate the deposition of pitch and other contaminants thereby allowing the press section to operate without the need for downtime during the four to eight week life span of the felts.

These and other features and advantages of the present invention will become more readily apparent to those skilled in the art upon consideration of the following detailed description and accompanying drawings, which describe both the preferred and alternative embodiments of the present invention.

DETAILED DESCRIPTION OF THE PREFERRED EMBODIMENTS

Figure 1:
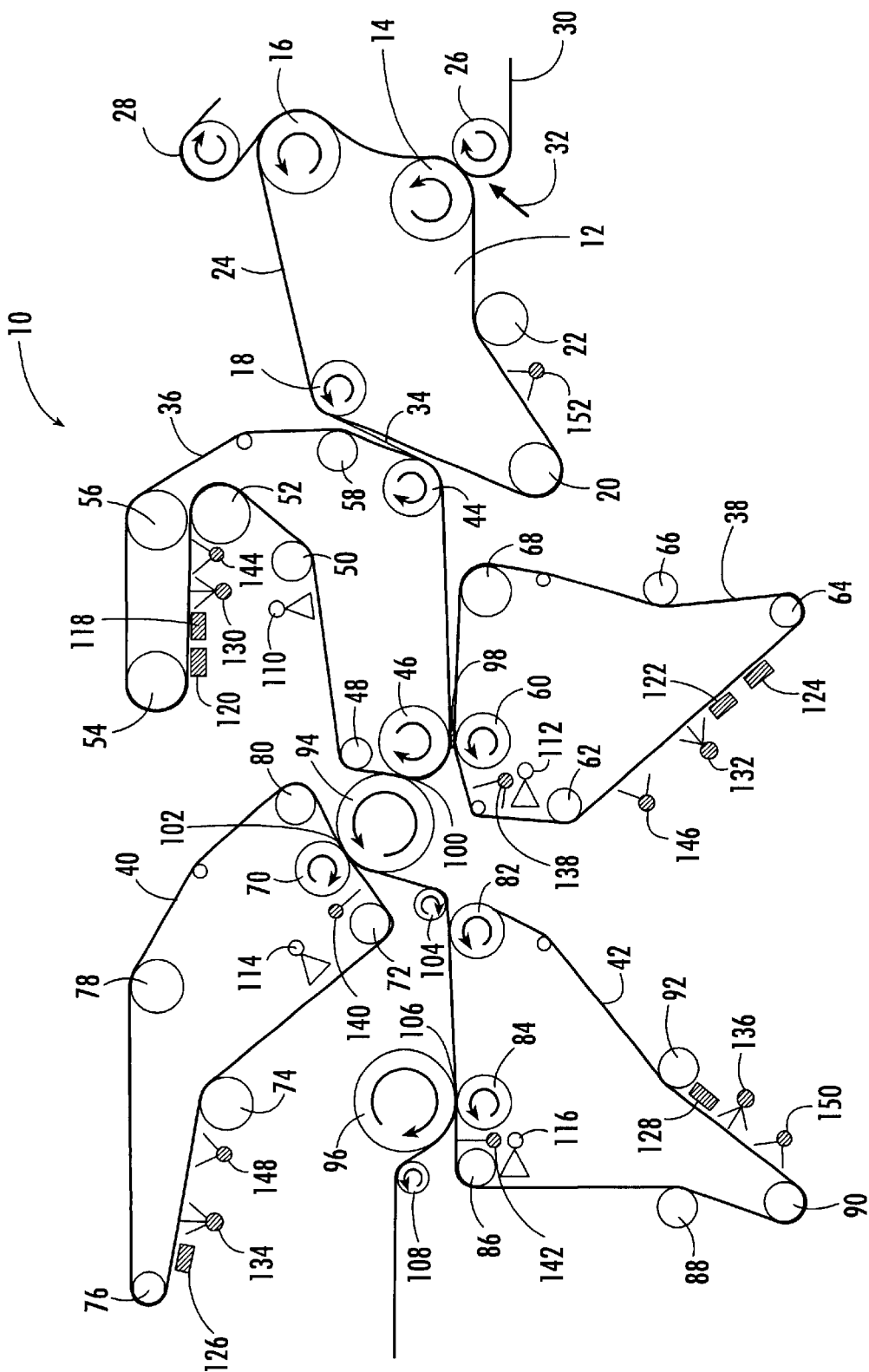
FIG. 1 is a schematic drawing of a felt press section of a pulp and paper process in accordance with the invention.

In the following detailed description and accompanying drawings, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings. Like numbers refer to like elements throughout.

The present composition uses a combination of a cleaning solvent and a surfactant to prevent the deposition of contaminants from resinous pulp and/or recycled pulp in the felt press section of a pulp and paper process. The cleaning solvent comprises a blend of aromatic hydrocarbons containing between nine and eleven carbon atoms that preferably has a flash point of greater than 140° F. Although the cleaning solvent includes aromatic hydrocarbons containing between nine and eleven carbon atoms, it can also include aromatic hydrocarbons having less than nine or carbon atoms or having more than eleven carbon atoms in accordance with the invention. Preferably, the cleaning solvent includes at least about 95% aromatic hydrocarbons, more preferably, more than about 98% aromatic hydrocarbons. The cleaning solvent (and the composition itself) is preferably substantially free of naphthalene (e.g. less than 1%). In addition, the present composition effectively cleans the pressing equipment while using a minimal amount of VOC's. An exemplary cleaning solvent for use in the invention is SURE SOL® 150ND, a C9–C11, naphthalene-depleted mononuclear aromatic solvent commercially available from Koch Specialty Chemical Company in Houston, Tex. (USA), having a specific gravity of 0.8796, a flash point of about 145° F. and greater than 98% aromatic hydrocarbons.

The surfactant used in the present composition is an alcohol ethoxylate. The alcohol ethoxylates used in the invention typically include between 6 and 16 moles ethylene oxide (EO), preferably between 8 and 10 moles ethylene oxide, per mole of alcohol. Preferably, the alcohol ethoxylates are branched or secondary alcohol ethoxylates and more preferably, the alcohol ethoxylate is a tridecyl alcohol ethoxylate. An exemplary branched tridecyl alcohol ethoxylate having 8.5 moles ethylene oxide per mole of alcohol is Rhodasurf TDA 8.5 available from Rhodia in Cranbury, N.J. (USA). The surfactant used in the composition (and the composition itself) is substantially free of nonylphenol ethoxylates and other alkylphenol ethoxylates. In addition, the composition is preferably substantially free of other environmentally undesirable SARA reportable compounds.

The cleaning solvent and the surfactant are combined in the composition of the invention such that the mass ratio of cleaning solvent to alcohol ethoxylate surfactant in the present composition is preferably from about 1:10 to about 10:1, more preferably from about 1:3 to about 3:1. A particularly useful ratio of cleaning solvent to alcohol ethoxylate surfactant for removing pitch is 1:2.

In addition to the cleaning solvent and the alcohol ethoxylate, the present composition can also include other components. For example, the composition typically includes one or more formulation solvents to provide increased stability to the composition to prevent it from gelling or separating in storage. The formulation solvents are preferably substantially free of naphthalene and other undesirable compounds. Exemplary formulation solvents include polypropylene glycols, polyethylene glycols, d-limonene, propylene glycol n-butyl ethers, propylene glycol monomethyl ethers, dipropylene glycol monomethyl ethers, ethylene glycol monobutyl ethers, branched alcohol acetic acid esters (e.g. EXXATE® 800 from Exxon), aliphatic solvents and solvent blends, N-methyl-2-pyrrolidone, tetrahydrofurfuryl alcohols, and diisopropyl/triisopropylbiphenyl solvents. Water is also generally added to the formulation to provide increased flowability to the composition. Furthermore, the composition can also include additional non-alkylphenol surfactants to provide increased stability, e.g., in the presence of high concentrations of calcium ions.

Buffers can also be included in the composition to provide a desired pH for use in the press felt section. The present composition can further include other additives known in the art for use in pulp and paper processes.

The present composition preferably includes from 5 to 80% of the aromatic hydrocarbon cleaning solvent, from 15 to 90% of the alcohol ethoxylate surfactant, from 0 to 15% of the formulation solvent, from 0 to 20% water, from 0 to 2% of a second surfactant, and from 0 to 5% of buffers and other additives, on a mass basis. More preferably, the composition includes from 15 to 45% of the aromatic hydrocarbon cleaning solvent, from 40 to 70% of the alcohol ethoxylate surfactant, from 2 to 12% of the formulation solvent, from 2 to 15% water, from 0 to 1% of the second surfactant, and from 0 to 5% of buffers and other additives.

The present invention further includes a method of using the composition described above to prevent the deposition of contaminants from resinous pulp and/or recycled pulp in the press section of a pulp and paper process. FIG. 1 is a schematic drawing of a press section 10 and a forming section 12 of a pulp and paper process, e.g., a process to make newsprint and linerboard.

The forming section 12 extracts moisture from paper pulp to produce a paper stock material that is advanced to the press section 10. The forming section 12 can be a Fourdrinier type wire machine, a twin-wire machine, or any other machine that delivers pulp sheet, particularly resinous pulp and/or recycled pulp sheet. The forming section 12 includes rolls 14, 16, 18, 20 and 22 that advance an inner wire mesh 24 in a counterclockwise direction. In addition, the forming section 12 includes rolls 26 and 28 that advance an outer wire mesh 30 in a clockwise direction. Paper pulp is sprayed between the inner wire mesh 24 and the outer wire mesh 30 as indicated by arrow 32. The paper pulp is advanced by rolls 14 and 16 between the inner wire mesh 24 and the outer wire mesh 30 and moisture is removed from the paper pulp through the wire meshes. The outer wire mesh 30 is then advanced by roll 28 and separates from the paper pulp. The paper pulp advances with the inner wire mesh 24 around rolls 16 and 18. The paper pulp is advanced by roll 18 as paper stock material 34 having a solids content of about 20% and the paper stock material is further advanced to the press section 10.

The press section 10 includes a pick-up felt 36, a first bottom felt 38, a third felt 40 and a fourth felt 42. The felts 36, 38, 40 and 42 can be formed of any material that maintains moisture such as a woven nylon mat. The pick-up felt 36 is advanced via rolls 44, 46, 48, 50, 52, 54, 56 and 58 in a clockwise direction; the first bottom felt 38 is advanced via rolls 60, 62, 64, 66 and 68 in a counterclockwise direction; the third felt 40 is advanced via rolls 70, 72, 74, 76, 78 and 80 in a clockwise direction; and the fourth felt 42 is advanced via rolls 82, 84, 86, 88, 90 and 92 in a counterclockwise direction. The press section 10 further includes a nip roll 94 that rotates in a counterclockwise direction and a nip roll 96 that rotates in a clockwise direction.

In operation, the roll 18 delivers paper stock material 34 from the forming section 12 to the press section 10, and particularly the pick-up felt 36 of the press section. The paper stock material 34 contacts the pick-up felt 36 and is advanced via rolls 44 and 46. In addition, the paper stock material 34 contacts the first bottom felt 38 as it advances towards roll 46. In this portion of the press section 10, there is a nip 98 formed between rolls 46 and 60 wherein the paper stock material 34 is pressed between the felts 36 and 38, resulting in the transfer of moisture from the paper stock material to the felts.

As the pick-up felt 36 and paper stock material 34 advance around roll 46, the pick-up felt and paper stock material are again pressed together at a second nip 100 formed between roll 46 and nip roll 94, thereby forcing additional moisture out of the paper stock material into the pick-up felt. The paper stock material 34 is advanced by nip roll 94 to a third nip 102 between the nip roll and roll 70 that presses the paper stock material and the third felt 40 together further removing moisture from the paper stock material.

Once the paper stock material 34 leaves the nip 102, it is advanced by roll 104 and then by rolls 82 and 84 and contacts the fourth felt 42. The paper stock material 34 and the fourth felt 42 advance to a fourth nip 106 formed by nip roll 96 and roll 84. At this fourth nip 106, the fourth felt 42 and the paper stock material 34 are pressed together again removing moisture from the paper stock material. The paper stock material 34 leaves the nip 106 and is advanced by roll 108 to further processing, e.g. drying.

In resinous and/or recycled pulp processes, the paper stock material 34 can include pitch and other contaminants such as ink, sizing agents, coatings, waxes and stickies. As a result, these contaminants can deposit on the equipment in the felt press section 10 such as the felts, rolls, uhle boxes, and the like. In particular, these contaminants can collect on the surface of the felts 36, 38, 40 and 42 thereby blocking or filling the surface of the felts. This felt filling can prevent the felts 36, 38, 40 and 42 from efficiently absorbing the moisture from the paper stock material 34.

In accordance with the invention, the advancing felts 36, 38, 40 and 42 are continuously washed with a diluted form of the present composition after contacting the paper stock material 34. The present composition is diluted in water such that the composition as applied includes a deposition-inhibiting amount of the composition. Preferably, the diluted composition includes from 100 ppm to 10,000 ppm of the cleaning composition in water.

In FIG. 1, the diluted composition is applied to the felts 36, 38, 40 and 42 using any suitable apparatus such as chemical showers 110, 112, 114 and 116. Preferably, the chemical showers 110, 112, 114 and 116 are fan showers that apply the composition across the advancing felts 36, 38, 40 and 42. In addition, high-pressure showers can be used to mechanically dislodge the contaminants on the surface of the felts 36, 38, 40 and 42. Moreover, the diluted composition is preferably applied to the felts 36, 38, 40 and 42 using water at an elevated temperature of between about 120° F. and 180° F.

The diluted composition breaks down and loosens the contaminants deposited on the felts 36, 38, 40 and 42. Once the diluted composition has been applied to the felts 36, 38, 40 and 42, the felts are advanced to uhle boxes 118, 120, 122, 124, 126 and 128, that apply suction to the felts and remove both the water and the contaminants loosened by the present composition from the felts. Typically, after the diluted composition is applied to the felts 36, 38, 40 and 42, the felts are normally lubricated prior to advancing to the uhle boxes 118, 120, 122, 124, 126 and 128 using lube showers 130, 132, 134 and 136, thereby minimizing felt wear at the uhle boxes. In addition, the press section 10 can include caustic showers 138, 140 and 142 and needle showers 144, 146, 148 and 150 that further loosen contaminants on the surface of the felts 36, 38, 40 and 42. The forming section 12 can also include a needle shower 152 to remove contaminants from the inner wire mesh 24.

Although not illustrated in FIG. 1, the present composition can also be applied to the rolls and uhle boxes to loosen or break down contaminants deposited on this equipment.

Figure 2:
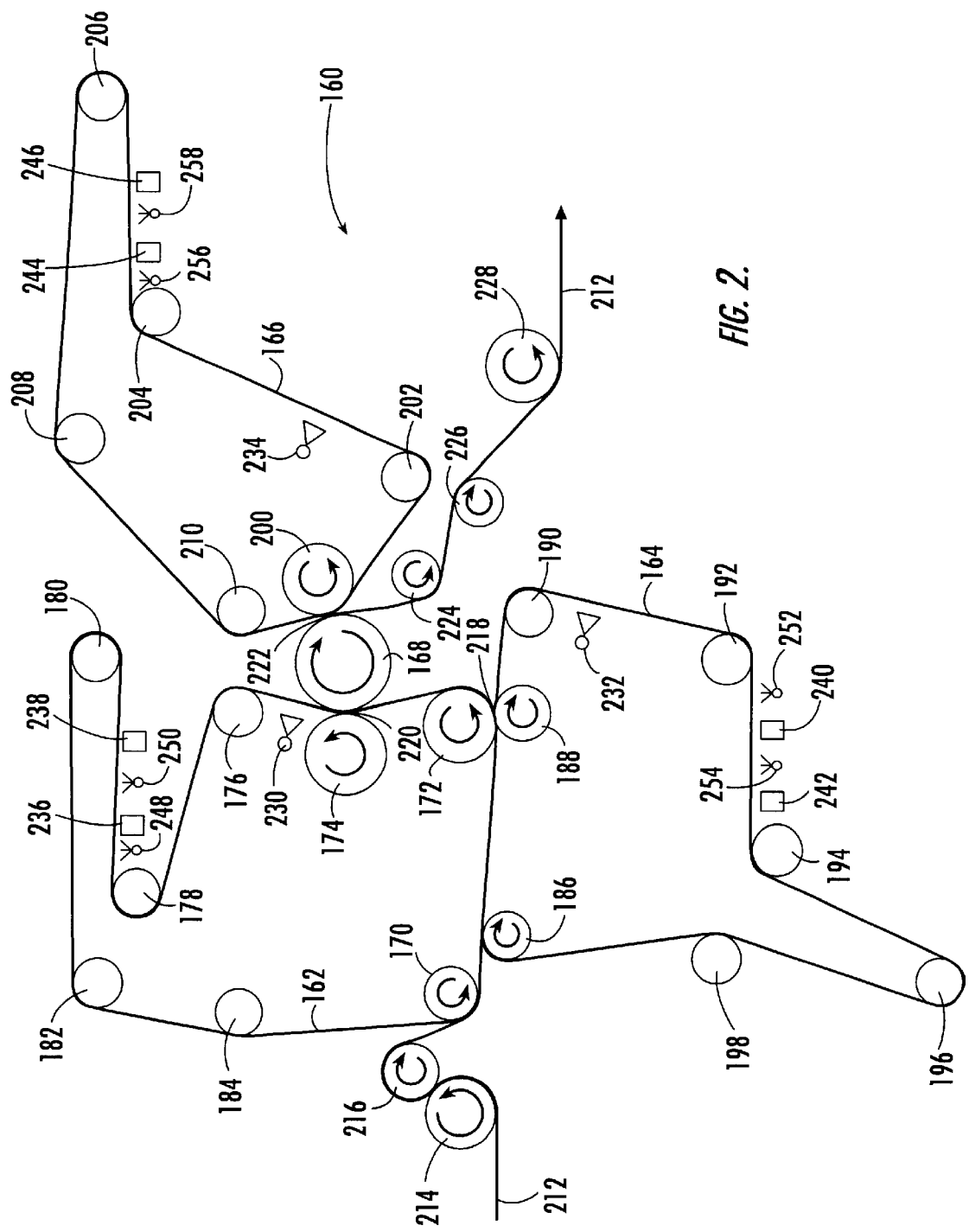
FIG. 2 is a schematic drawing of an alternative felt press section of a pulp and paper process in accordance with the invention.

FIG. 2 illustrates an alternative felt press section 160 that can be used in accordance with the invention having a different configuration than the felt press section 10 of FIG. 1. The felt press section 160 includes a pick-up felt 162, a first bottom felt 164, a third top felt 166 and a nip roll 168. The pick-up felt 162 is advanced via rolls 170, 172, 174, 176, 178, 180, 182 and 184 in a counterclockwise direction; the first bottom felt 164 is advanced via rolls 186, 188, 190, 192, 194, 196 and 198 in a clockwise direction; and the third top felt 166 is advanced via rolls 200, 202, 204, 206, 208 and 210 in a counterclockwise direction. The nip roll 168 is rotated in a clockwise direction.

In operation, a paper stock material 212 is advanced from rolls 214 and 216 to the felt press section 160. The paper stock material 212 can be provided from an upstream location such as a Fourdrinier type wire machine, a twin wire machine or any other machine that delivers pulp sheet, particularly resinous pulp and/or recycled pulp sheet. In the press section 160, the paper stock material 212 is advanced by roll 170 and contacts the pick-up felt 162 along this roll. The pick-up felt 162 and the paper stock material 212 are advanced by roll 170 to roll 186, where the paper stock material is further contacted by the first bottom felt 164. The pick-up felt 162, the first bottom felt 164 and the paper stock material 212 are advanced to a nip 218 between rolls 172 and 188. At nip 218, the paper stock material 212 is pressed between the pick-up felt 162 and the first bottom felt 164 and moisture is forced out of the paper stock material into the felts.

The paper stock material 212 advances with the pick-up felt 162 along roll 172 to a second nip 220 formed between roll 174 and nip roll 168. At the nip 220, the paper stock material 212 and the pick-up felt 162 are pressed together thereby removing moisture from the paper stock material. The paper stock material 212 is then advanced by nip roll 168 to a third nip 222 formed between roll 200 and nip roll 168. At the nip 222, the paper stock material 212 and the third top felt 166 are pressed together resulting in further moisture removal from the paper stock material. After the paper stock material 212 leaves the nip 222, it is advanced by rolls 224, 226 and 228 to further processing, e.g., drying.

As described above with respect to FIG. 1, when resinous and/or recycled pulp processes are used, the paper stock material 212 can include pitch and other contaminants such as ink, sizing agents, coatings, waxes and stickies, and these contaminants can deposit on the equipment in the felt press section 160 and particularly on the surface of the felts 162, 164 and 166. Therefore, the felts 162, 164 and 166 are washed with a diluted form of the present composition after contacting the paper stock material 212.

In FIG. 2, the diluted composition is applied to the felts 162, 164 and 166 using any suitable apparatus such as fan showers 230, 232 and 234, preferably at an elevated temperature. Once the diluted composition has been applied to the felts 162, 164 and 166, the felts are advanced to uhle boxes 236, 238, 240, 242, 244 and 246 that apply suction to the felts and remove both the water from the felts and the contaminants loosened by the present composition. After the diluted composition is applied to the felts 162, 164 and 166 and prior to advancing to the uhle boxes 236, 238, 240, 242, 244 and 246, the felts are normally lubricated using lube showers 248, 250, 252, 254, 256 and 258. Although not illustrated in FIG. 2, the press section 160 can also include additional showers that further loosen contaminants on the surface of the felts 162, 164 and 166, and the present composition can also be applied to the rolls and uhle boxes to loosen or break down contaminants deposited on this equipment.

Although FIGS. 1 and 2 illustrate exemplary felt press sections for use with the invention, it will be readily understood by those skilled in the art that these press sections can have numerous felt and roll configurations and the present invention is not limited to the particular configurations illustrated in these figures. Furthermore, one skilled in the art would readily understand that the showers for applying the chemical composition of the invention can be provided at different locations than those shown in FIGS. 1 and 2 and the present invention is also not limited to the locations illustrated in these figures.

The present invention will now be further demonstrated by the following non-limiting examples.

EXAMPLE 1

Actual fresh pitch from deposits in a thermomechanical pulp (TMP) mill were smeared onto MYLAR® coupons. MYLAR® was chosen because its surface energy and interactions are known to be similar to that of nylon, which is a common component of paper making felts. MYLAR® is also related in behavior to other surfaces like polyethylene and rubber used for uhle box covers and rolls. The coupons were mounted in the shear zone of a blender and 200 ml of water at a temperature of 120° F. and the chemicals listed in Table 1 were added to the blender. The blender was run at a low setting for 5 minutes. The performance of the formulation was determined by measuring the fraction of the applied pitch that was removed. This was determined by weighing the coupons before applying the mill pitch, after applying the pitch, and after exposure to the cleaning chemicals. Table 1 below shows the results of these tests.

TABLE 1

Performance of Surfactant and Surfactant/Solvent Combinations in Removing Pitch

| | % Removal of Pitch | | | |
| --- | --- | --- | --- | --- |
| Chemical Name | 3,000 ppm Surfactant only | 3,000 ppm Surfactant 3,000 ppm Solvent* | 2,000 ppm Surfactant 2,000 ppm Solvent* | 1,000 ppm Surfactant 1,000 ppm Solvent* |
| Nonylphenol Ethoxylate with 9 mole EO (comparative) | 20% | 92% | 88% | 80% |
| Branched Tridecyl Alcohol Ethoxylate with 8.5 moles EO | 54% | 99% | 96% | 90% |
| 12–14 Carbon Secondary Alcohol Ethoxylate with 9 moles EO | 57% | | 94% | 88% |
| 12–15 Carbon linear alcohol ethoxylate with 3 moles EO | 16% | | 48% | |
| 12–14 Carbon linear alcohol ethoxylate with 7 moles EO | 31% | | 74% | 50% |
| 12–16 Carbon linear alcohol ethoxylate with 7 moles EO | 55% | | 88% | 72% |
| 14 Carbon linear alcohol ethoxylate with 7 moles EO | 67% | | 50% | 38% |
| 12–14 Carbon linear alcohol ethoxylate with 9 moles EO | 0% | 90% | 91% | 72% |
| 12–16 Carbon linear alcohol ethoxylate with 9 moles EO | 0% | | 96% | 89% |
| 12–16 Carbon linear alcohol ethoxylate with 11 moles EO | 0% | | 92% | 86% |

TABLE 1-continued

Performance of Surfactant and Surfactant/Solvent Combinations in Removing Pitch

| | % Removal of Pitch | | | |
|---|---|---|---|---|
| Chemical Name | 3,000 ppm Surfactant only | 3,000 ppm Surfactant 3,000 ppm Solvent* | 2,000 ppm Surfactant 2,000 ppm Solvent* | 1,000 ppm Surfactant 1,000 ppm Solvent* |
| 12–16 Carbon linear alcohol ethoxylate with 15 moles EO | 5% | | 81% | 84% |
| Alkyl diphenyl oxide disulfonate DOWFAX ® 2A1 from Dow (comparative) | 6% | | 60% | |
| Phosphate ester RHODAFAC ® RE-610 from Rhodia (comparative) | 8% | | 97% | |
| Phosphate ester MAYPHOS ® 8135 from BASF (comparative) | 18% | | 74% | |

*The solvent used was SURE SOL ® 150ND, a C 9–11 naphthalene-depleted, mononuclear aromatic solvent commercially available from Koch Specialty Chemical Company. 2500 ppm of the SURE SOL ® 150ND solvent was tested alone (without surfactants) and resulted in 42% removal. In addition, 2500 ppm tetra hydro furfural alcohol (THFA) was tested alone (without surfactants) and resulted in 6% removal, significantly less than the SURE SOL ® 150ND solvent.

As shown by the above data, the preferred surfactant/solvent combinations comprising the C9–C11 aromatic solvent and either the branched tridecyl alcohol ethoxylate or the secondary alcohol ethoxylate produced synergistic results when removing pitch, i.e., the actual combination of the surfactant and the solvent performed better than the expected additive effect for these components. In addition, some of the primary alcohol ethoxylates produced synergistic results when combined with the C9–C11 aromatic solvent. Moreover, the preferred branched and secondary alcohol ethoxylate surfactants were also more effective alone and in combination with the preferred solvent of the invention than the nonylphenol ethoxylates. The above tests show that the combination of the surfactants and solvents of the present invention are effective, even at very low concentrations.

EXAMPLE 2

Additional solvents were evaluated for use in conjunction with tridecyl alcohol ethoxylate using the method described in Example 1. The results of these tests are provided in Table 2 below.

TABLE 2

Performance of Combinations of Solvents with Tridecyl Alcohol Ethoxylate (TDA 8.5) in Removing Pitch

| Treatment | % Removal of Pitch |
|---|---|
| 1050 ppm of a 2:1 TDA 8.5/SURE SOL ® 150ND | 97% |
| 1050 ppm of a 2:1 TDA 8.5/SURE SOL ® 300 | 11% |
| 1050 ppm of a 2:1 TDA 8.5/d-Limonene | 88% |

SURE SOL ® 300 is a diisopropyl/triisopropyl biphenyl solvent from Koch Specialty Chemical Company As shown by the above data, the combination of the tridecyl alcohol ethoxylate and SURE SOL® 150ND at low concentrations was superior to other solvent blends in removing pitch from surfaces.

EXAMPLE 3

Uniform areas of MYLAR® coupons were coated with a retail automotive grease that was gray to black in color. The grease was used to simulate newsprint ink, which is basically a hydrocarbon oil with carbon black dispersed in it. These coated MYLAR® coupons were suspended in beakers of test cleaning solutions (50,000 ppm) that were in a temperature controlled water bath at 55° C. The solutions were further provided with moderate agitation using magnetic stirrers. At the end of a 15-minute exposure period, the MYLAR® coupons were removed and gently rinsed with cold water. The degree of grease removal was determined by placing the coupons on a white paper backing and measuring the brightness of the area that was previously coated with grease. The higher the measured brightness the more completely the grease had been removed. The results of this test are provided in Table 3 below.

TABLE 3

Performance of Components and Blends in Removing Ink Type Contaminants (Grease)

| Treatment | Measured Brightness |
|---|---|
| Nonylphenol Ethoxylate (9 moles) | 18.7 |
| Nonylphenol Ethoxylate/SURE SOL ® 150ND 2:1 Blend | 20.5 |
| Branched Tridecyl Alcohol Ethoxylate (8.5 moles) | 46.4 |
| Branched Tridecyl Alcohol Ethoxylate/ SURE SOL ® 150ND 2:1 Blend | 65.2 |
| *Solvent Only* | |
| SURE SOL ® 205 | 68.4 |
| SURE SOL ® 150ND | 67.8 |
| EXXATE ® 800 | 66.7 |
| d-Limonene | 66.0 |
| Aliphatic 140 Solvent | 67.3 |
| DOWANOL ® PnB | 59.4 |
| Propylene Glycol | 16.4 |
| DOWANOL ® DPM | 15.9 |
| DOWANOL ® PM | 15.9 |
| m-Pyrol | 15.6 |
| Tetrahydrofurfuryl alcohol | 13.8 |
| Butyl CELLOSOLVE ® | 13.4 |
| *Surfactant Only* | |
| Alkyl phenyl oxide disulfonate DOWFAX ® 2A1 from Dow | 13.7 |
| 14–16 Olefin Sulfonate BIO TERGE ® AS-40 from Stepan | 13.7 |
| Alkyl Benzene Sulfonate BIOSOFT ® D-40 from Stepan | 12.7 |
| Phosphate ester with undisclosed structure from BASF MAYPHOS ® 8135 | 11.1 |

SURE SOL ® 205: Mixed aromatic solvent with flash point of 205 F. from Koch
EXXATE ® 800: Branched alcohol acetic acid ester with Flash point of 171 F. from Exxon
Aliphatic 140 Solvent: Generic aliphatic solvent blend with flash point of 140 F. from Ashland
DOWANOL ® PnB: Propylene glycol n-butyl ether from Dow
DOWANOL ® DPM: Dipropylene glycol monomethyl ether from Dow
DOWANOL ® PM: Propylene glycol monomethyl ether from Dow
m-Pyrol: N-methyl-2-pyrrolidone from International Specialty Products
Butyl CELLOSOLVE ®: Ethylene glycol monobutyl ether from Union Carbide As shown by the above data, the tridecyl alcohol ethoxylate alone or in combination with the preferred solvent was superior to the prior art nonylphenol ethoxylates as well as many other surfactants of common use in removing ink-type deposits. In addition, the aromatic solvents with flash points of 140° F. or greater were more effective than many other solvents in common use at removing ink-type deposits.

EXAMPLE 4

A composition was prepared according to the invention comprising the following components on a per mass basis:
   30% SURE SOL® 150ND
   54% Tridecyl alcohol ethoxylate (8.5 moles ethylene oxide)
   7% Propylene Glycol
   9% Water This composition was used in the press felt section of a paper machine that made paper from a combination of resinous and recycled pulp sources and that previously operated using a nonylphenol-containing composition. The composition of the invention was found to be superior to the nonylphenol-containing composition at removing pitch and other deposits from the press felt section. Although the composition of the invention displayed good stability, it experienced some flocking and gelling when it was diluted with hot water containing high concentrations of calcium ions.

EXAMPLE 5

A composition was prepared according to the invention comprising the following components on a per mass basis:
   30% SURE SOL® 150ND
   54% Tridecyl alcohol ethoxylate 8.5 moles
   7% Propylene Glycol
   0.6% DOWFAX® 2A1
   8.4% Water This composition was also used in the press felt section of a paper machine making paper from a combination of resinous and recycled pulp sources. This composition was also found to be superior to the nonylphenol-containing composition at removing pitch and other deposits from the press felt section. Furthermore, it was found to be stable over the full dilution range (i.e. 100 to 10,000 ppm) even under the dilution conditions described in Example 4.

It is understood that upon reading the above description of the present invention and reviewing the accompanying drawings, one skilled in the art could make changes and variations therefrom. These changes and variations are included in the spirit and scope of the following appended claims.

That which is claimed:

1. A composition for inhibiting the deposition of contaminants on pulp and paper machinery including:
   a cleaning solvent comprising a blend of aromatic hydrocarbons containing between nine and eleven carbon atoms;
   an alcohol ethoxylate; and
   a polypropylene glycol.

2. The composition according to claim 1, said composition being substantially free of alkyl phenols and alkylphenol ethoxylates.

3. The composition according to claim 1, said composition being substantially free of naphthalene.

4. The composition according to claims 1, wherein the cleaning solvent has a flash point of greater than 140° F.

5. The composition according to claim 1, wherein said alcohol ethoxylate is selected from the group consisting of branched alcohol ethoxylates, secondary alcohol ethoxylates, and mixtures thereof.

6. The composition according to claim 1, further comprising water.

7. The composition according to claim 1, wherein the mass ratio of cleaning solvent to alcohol ethoxylate is from about 1:10 to about 10:1.

8. The composition according to claim 7, wherein the ratio is from about 1:3 to about 3:1.

9. The composition according to claim 1, wherein the alcohol ethoxylate includes between 6 and 16 moles ethylene oxide per mole of alcohol.

10. The composition according to claim 1, wherein the alcohol ethoxylate includes between 8 and 10 moles ethylene oxide per mole of alcohol.

11. The composition according to claim 1, further comprising an additional surfactant.

12. A composition for inhibiting the deposition of contaminants on pulp and paper machinery including:
   a cleaning solvent comprising a blend of aromatic hydrocarbons containing between nine and eleven carbon atoms; and
   an alcohol ethoxylate, wherein the alcohol ethoxylate includes a tridecyl alcohol ethoxylate.

13. The composition according to claim 12, said composition being substantially free of alkyl phenols and alkylphenol ethoxylates.

14. The composition according to claim 12, said composition being substantially free of naphthalene.

15. The composition according to claim 12, wherein the cleaning solvent has a flash point of greater than 140° F.

16. The composition according to claim 12, further comprising a formulation solvent.

17. The composition according to claim 16, wherein said formulation solvent is a polypropylene glycol.

18. The composition according to claim 12, further comprising water.

19. The composition according to claim 12, wherein the mass ratio of cleaning solvent to alcohol ethoxylate is from about 1:10 to about 10:1.

20. The composition according to claim 19, wherein the ratio is from about 1:3 to about 3:1.

21. The composition according to claim 12, wherein the alcohol ethoxylate includes between 6 and 16 moles ethylene oxide per mole of alcohol.

22. The composition according to claim 12, wherein the alcohol ethoxylate includes between 8 and 10 moles ethylene oxide per mole of alcohol.

23. The composition according to claim 12, further comprising an additional surfactant.

24. A composition for inhibiting the deposition of pitch and other deposits on pulp and paper machinery comprising:
   a cleaning solvent comprising a blend of aromatic hydrocarbons containing between nine and eleven carbon atoms, having a flash point of greater than 140° F., and being substantially free of naphthalene;
   from 0 to 20% water; and
   a surfactant selected from the group consisting of branched alcohol ethoxylates, secondary alcohol ethoxylates, and mixtures thereof;
   said composition being substantially free of alkyl phenols and alkylphenol ethoxylates.

25. The composition according to claim 24, comprising from 5 to 80% of the cleaning solvent, from 15 to 90% of the surfactant, from 0 to 15% of a formulation solvent, from 0 to 2% of a second surfactant, and from 0 to 5% of a buffer.

26. The composition according to claim 24, further comprising a formulation solvent.

27. The composition according to claim 26, further comprising water.

28. The composition according to claim 27, comprising from 15 to 45% of the cleaning solvent, from 40 to 70% of the surfactant, from 2 to 12% of the formulation solvent, from 2 to 15% water, from 0 to 1% of a second surfactant, and from 0 to 5% of a buffer.

29. The composition according to claim 24, wherein the mass ratio of cleaning solvent to alcohol ethoxylate is from about 1:10 to about 10:1.

30. The composition according to claim 29, wherein the ratio is from about 1:3 to about 3:1.

31. The composition according to claim 24, wherein the alcohol ethoxylate includes between 6 and 16 moles ethylene oxide per mole of alcohol.

32. The composition according to claim 24, wherein the alcohol ethoxylate includes between 8 and 10 moles ethylene oxide per mole of alcohol.

33. The composition according to claim 24, wherein the alcohol ethoxylate is a tridecyl alcohol ethoxylate.

34. A composition for inhibiting the deposition of pitch and other deposits on pulp and paper machinery comprising:
   a cleaning solvent comprising a blend of aromatic hydrocarbons containing between nine and eleven carbon atoms, having a flash point of greater than 140° F., and being substantially free of naphthalene; and
   a tridecyl alcohol ethoxylate;
   said composition being substantially free of alkyl phenols and alkylphenol ethoxylates.

* * * * *